United States Patent [19]

Schmidt et al.

[11] 4,152,593

[45] May 1, 1979

[54] METHOD AND APPARATUS FOR MAKING LATENT IMAGES OF OBJECT-MODULATED X-RAYS

[75] Inventors: Manfred Schmidt; Jürgen Müller, both of Munich; Josef Pfeifer, Unterhaching; Alfred Rheude, Munich; Rolf Eickel, Munich; Dieter Tolksdorf, Munich, all of Fed. Rep. of Germany

[73] Assignee: AGFA-Gevaert, A.G., Leverkusen, Fed. Rep. of Germany

[21] Appl. No.: 832,884

[22] Filed: Sep. 13, 1977

[30] Foreign Application Priority Data

Sep. 18, 1976 [DE] Fed. Rep. of Germany ....... 2642084
Aug. 17, 1977 [DE] Fed. Rep. of Germany ....... 2737036

[51] Int. Cl.$^2$ .............................................. G03B 41/16
[52] U.S. Cl. ............................................... 250/315 A
[58] Field of Search ........................ 250/315 A, 315 R

[56] References Cited

U.S. PATENT DOCUMENTS 4,066,896 1/1978 Kuhn .............................. 250/315 A

*Primary Examiner*—Craig E. Church
*Attorney, Agent, or Firm*—Peter K. Kontler

[57] ABSTRACT

An ionography imaging chamber wherein the front side face of the pressure vessel is immediately adjacent to the foremost portion of the interelectrode gap and the image-receiving part of a dielectric receptor sheet in the gap extends into immediate proximity of the front side face. The front part of the margin of the sheet is bent over the front edge portion of one of the electrodes, and the gasket which seals the interelectrode gap while the latter is filled with compressed high Z gas abuts against the folded-over front part of the sheet. The sheet is attached to a drawer which carries one of the electrodes and is insertable into a compartment of the main section of the pressure vessel. One or more auxiliary electrodes are installed in the foremost portion of the gap to prevent distortion of latent images in the region which is nearest to the front side face of the pressure vessel.

42 Claims, 9 Drawing Figures

4D
4c
12a
15a
23
9
A
15
30
29
4E
7e
4b
110
22,24
50
4B
10
4a
8
12
15b
7
11
16
13
14
21
7aa
4A
26
17
18
19
20
7a
27
B
25
25a
7c
7bb
7b
120
22
15a
23a

METHOD AND APPARATUS FOR MAKING LATENT IMAGES OF OBJECT-MODULATED X-RAYS

BACKGROUND OF THE INVENTION

The present invention relates to a method and apparatus for making X-ray pictures on dielectric receptor or carrier sheets. More particularly, the invention relates to improvements in a method and apparatus for making latent images of X-rayed objects on dielectric receptor sheets in the interelectrode gap of an ionography imaging chamber. Still more particularly, the invention relates to improvements in a method and apparatus for making latent images of X-rayed objects in the interelectrode gap of an ionography imaging chamber which is filled with a compressed high Z gas, such as Xenon, Krypton or Freon. X-rays which penetrate into the imaging chamber produce electrons in the gap, and such electrons cause the development of a latent image on the sheet which lies against one of the electrodes.

Radiographic systems with xerographic printing are disclosed, for example, in U.S. Pat. No. 3,828,192 granted Aug. 6, 1974 to Morsell and in U.S. Pat. No. 3,774,029 granted Nov. 20, 1973 to Muntz et al. A drawback of the patented systems is that the latent image cannot extend close to one or more outer side faces of the imaging chamber. This is due to the fact that the sealing means which is interposed between the sections of the imaging chamber surrounds all parts of the margin of a properly inserted dielectric carrier sheet. Latent images which extend all the way to or into very close proximity of the outer side or sides of the imaging chamber are desirable in many instances, e.g., for radiographic examination of female breasts. As a rule, the physician desires to obtain an image of the entire breast, i.e., also of that portion which is immediately adjacent to the rib cage.

OBJECTS AND SUMMARY OF THE INVENTION

An object of the invention is to provide a radiographic imaging method which renders it possible to produce latent images of X-rayed objects in close proximity of a side face of the imaging chamber.

Another object of the invention is to provide a novel and improved apparatus for the making of mammagraphs.

A further object of the invention is to provide a novel and improved ionography imaging chamber which can be utilized in an apparatus of the just outlined character.

An additional object of the invention is to provide an ionography imaging chamber which is constructed and assembled in such a way that the object to be X-rayed (such as the breast of a female patient) can be imaged in its entirety in spite of the fact that such object is not separable from another object (such as the torso of a patient).

Another object of the invention is to provide an ionography imaging chamber which allows for convenient and time-saving attachment or separation of dielectric carrier sheets from a section of the pressure vessel which defines the interelectrode gap.

An ancillary object of the invention is to provide a pressure vessel which is constructed and assembled in such a way that, once a dielectric carrier sheet is properly secured to one of its sections, the sheet need not be detached therefrom for the purpose of making a permanent image of the X-rayed object and/or for destroying the electrostatic charge preparatory to renewed use of the same sheet.

One feature of the invention resides in the provision of a method of forming latent images of object-modulated X-rays on a dielectric carrier sheet in an ionography imaging chamber whose interelectrode gap is filled with compressed high Z gas and at least one outer side face of which is accessible to permit the placing of an object onto the chamber (particularly the placing of a female breast onto the chamber while the rib cage of the patient abuts or is closely adjacent the outer side face of the chamber). The method comprises the steps of extending a portion of the interelectrode gap into close proximity of the one side face of the chamber (i.e., selecting the thickness of the respective side wall or panel of the chamber in such a way that the nearest peripheral portion of the normally square or rectangular gap is closely adjacent the outer side face), inserting a dielectric carrier sheet into the gap and flexing that part of the margin of the inserted sheet which is adjacent the outer side face of the chamber (the aforementioned part of the margin of the sheet can be flexed through 180 degrees or through a number of other angles, e.g., substantially less than 180 degrees but not substantially less than 90 degrees), and establishing a fluidproof seal between the entire margin of the inserted sheet (inclusive of the flexed part of the margin) and the chamber to prevent escape of high Z gas from the interelectrode gap. The last mentioned step comprises placing a deformable gasket into sealing engagement with the margin of the inserted sheet so that a portion of the gasket sealingly engages the flexed part of the margin. The sealing action of the gasket can be assisted by compressed high Z gas in the interelectrode gap.

The aforementioned part of the margin of a properly inserted carrier sheet is preferably flexed about the adjacent edge portion of one of the electrodes. The electrodes are preferably spherical electrodes which are centered at the source of X-rays.

The method preferably further comprises the step of biasing one side of the carrier sheet in the gap against the one electrode (normally under the pressure of compressed high Z gas). The step of establishing a fluidproof seal between the sheet and the chamber includes biasing the gasket against the other side of the non-flexed part of the margin of the carrier sheet in the gap.

The method preferably also includes the steps of withdrawing one electrode from the chamber prior to attachment of a carrier sheet thereto, inserting the electrode and the sheet into the chamber prior to an exposure, and withdrawing the one electrode and the sheet from the chamber subsequent to completion of the exposure to facilitate the separation of carrier sheet (with a latent image thereon) from the one electrode.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
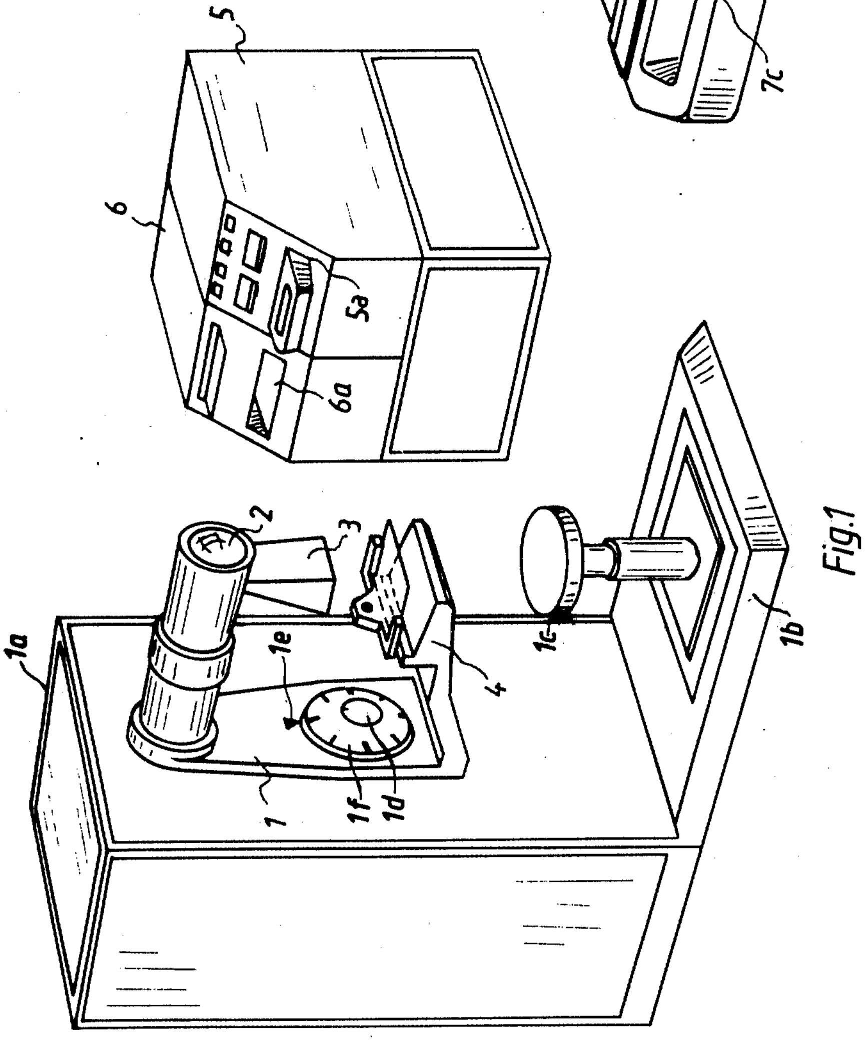
FIG. 1 is a schematic perspective view of an apparatus which embodies one form of the invention.

FIG. 1 shows a mammagraph which includes an upright carrier 1*a* and a base 1*b* for a seat 1*c*. The front side of the carrier 1*a* mounts a support 1 which is pivotably mounted at 1*d* and has an index 1*e* movable about a stationary scale 1*f*. The support 1 carries an X-ray tube 2 with a shield 3, and an ionography imaging chamber 4 which is constructed and assembled in accordance with the invention.

The apparatus further includes a conditioning unit 5 and a developing unit 6. The conditioning unit 5 serves to destroy the charge on dielectric carrier sheets 15 (FIGS. 2–4) which are to be introduced into the imaging chamber 4. The developing unit 6 comprises conventional means for converting the latent electrostatic images on carrier sheets into visible images, e.g., by resorting to toner particles.

Figure 2:
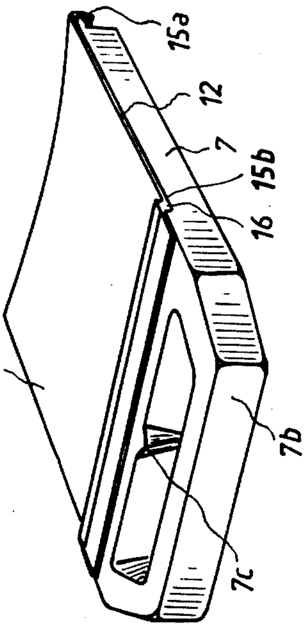
FIG. 2 is a perspective view of a removable section of the ionography imaging chamber in the apparatus of FIG. 1.
Figures 3, 4:
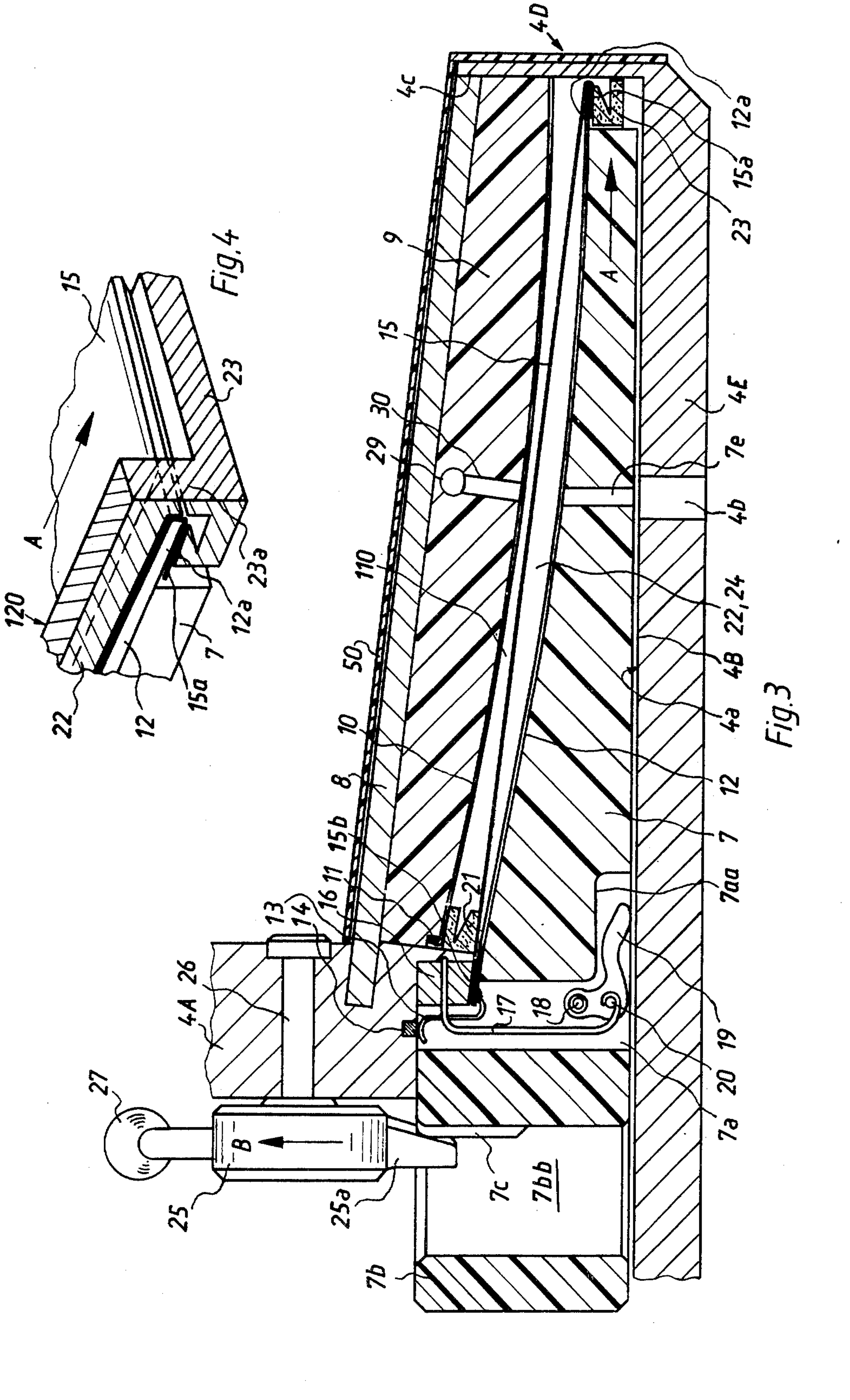
FIG. 3 is an enlarged longitudinal vertical sectional view of the imaging chamber in the apparatus of FIG. 1.
FIG. 4 is an enlarged fragmentary perspective view of a detail in the right-hand portion of FIG. 3.

The reference character 7 denotes in FIGS. 2–4 a drawer-like section of the ionography imaging chamber 4. This section, with a dielectric carrier sheet 15 thereon, can be introduced into the inlet 5*a* of the unit 5 to destroy the charge on the sheet, or into the inlet 6*a* of the unit 6 to initiate the development of latent image on the carrier sheet. The apparatus is preferably furnished with several sections or drawers 7 so that the sheet 15 on a drawer which has been removed from the other section of the chamber 4 can be inserted into the unit 6 and a drawer 7 can be inserted into the unit 5 prior to introduction into the other section of the chamber 4. The rear portion of a drawer 7, with a dielectric carrier sheet 15 mounted thereon, is shown in FIG. 2. FIG. 4 shows the front portion of a drawer 7.

Referring to FIG. 3, the imaging chamber 4 comprises a pressure vessel including a main section 4A and a section 7, i.e., the aforementioned drawer which is insertable into and withdrawable from a compartment 4B of the section 4A. The section 4A comprises a beryllium plate 8 which overlies the drawer 7 and is located in the path of object-modulated X-rays issuing from the source 2. Beryllium exhibits a pronounced strength and highly satisfactory transmissivity for X-rays. The plate 8 overlies an insert or back support 9 made of a material having a low specific weight, for example, a polyurethane or acrylic foam. The underside of the insert 9 has a spherical shape and is overlapped by a spherical electrode 10 whose underside faces the interelectrode gap 110 of the chamber 4. The material of the insert 9 also offers a low resistance to the passage of X-rays. The electrode 10 is connected with a pin-shaped conductor 11 which extends laterally from the section 4A and is connected to an appropriate source of electrical energy. As a rule, apparatus of the type to which the present invention pertains are connected with an energy source which can apply to the electrodes a potential in the range of 10–15 kilovolts.

The section 4A further comprises a front wall or panel 4*c* which overlaps the front edge faces of the plate 8 and insert 9. It is preferred to coat the exposed upper side of the plate 8 and the exposed side of the panel 4*c* with a protective layer or film 50 of lacquer or synthetic plastic material which is an insulator and protects the body of a patient against direct contact with current-conducting components of the imaging chamber 4 as well as against direct contact with other metallic parts (including the plate 8). The front or outer side face 4D of the imaging chamber 4 is the outer side of that portion of the film 50 which coats the panel 4*c*. When a female patient undergoes examination, her breast rests on the exposed outer side of that portion of the film 50 which overlies the plate 8 and (if necessary) the rib cage of the patient can abut against or is immediately adjacent the outer side face 4D.

The surface 4*a* bounding the lower part of the compartment 4B in the section 4A constitutes a guideway or track along which the underside of the drawer 7 can slide during insertion into or withdrawal from the compartment 4B. At least the major part of the drawer 7 preferably consists of a lightweight material, most preferably a suitable synthetic plastic substance. Utilization of lightweight plastic material reduces the effort which is required to manipulate the drawer 7, i.e., to move the drawer between the section 4A of the imaging chamber 4 and the units 5 and 6. The upper side of the drawer 7 is convex and is overlapped by a second spherical electrode 12. When the drawer 7 is fully inserted into and locked in the compartment 4B in a manner as shown in FIG. 3, the electrode 12 is centered at the X-ray source 2, the same as the electrode 10 in the section 4A. The rear end portion of the electrode 12 (as viewed in the direction indicated by arrow A which indicates the direction of insertion of the drawer 7 into the compartment 4B) is connected with an elastic spring-like conductor 13 which bears against a pin-shaped contact 14 in the section 4A when the drawer 7 is fully inserted into the compartment 4B. The contact 14 extends laterally from the imaging chamber 4 and is connected to the aforementioned energy source. It is presently preferred to connect the permanently installed electrode 10 of the chamber 4 to the ground.

The front panel 4*c* of the section 4A is relatively thin, i.e., the interelectrode gap 110 extends close to the outer side face 4D of the imaging chamber 4. The fixedly installed electrode 10 extends all the way to the inner side of the panel 4*c*, and the leader or front edge portion 12*a* of the withdrawable electrode 12 (as considered in the direction indicated by arrow A) extends very close to or actually abuts the inner side of the panel 4*c*. In other words, the foremost part of the periphery of the gap 110 is located very close to the outer side face 4D. As shown in FIGS. 3 and 4, the edge portion 12*a* of the electrode 12 extends beyond the front portion of the drawer 7 so that it is accessible from above as well as from below.

The dielectric receptor or carrier sheet 15 is separably secured to the drawer 7 in the following way: The front part 15*a* of the margin of the sheet 15 is folded about the front edge face of the electrode portion 12*a* and overlies the underside of the edge portion 12*a*. The sheet 15 preferably consists of a very thin elastic material, such as Mylar (trademark) or a polyethylene film. It has been found that, in spite of its elasticity, a film consisting of such material is sufficiently stiff to retain the crease which receives the front edge face of the edge portion 12*a*, i.e., the folded-over part 15*a* of the margin of the sheet 15 remains adjacent the underside of the edge portion 12*a* when the latter is inserted into the pocket between the part 15*a* and the immediately adjacent portion of the sheet. All that is necessary to form the sheet 15 with a preferably pronounced crease between the part 15*a* and the adjacent portion of the sheet, i.e., it is not absolutely necessary to provide means for biasing the part 15*a* against the underside of the edge portion 12*a* in order to avoid separation of the sheet 15 from the front part of the drawer 7.

The rear part 15*b* of the margin of the sheet 15 is separably secured to the drawer 7 by a clamping device one form of which is shown in FIGS. 2 and 3. This clamping device comprises an elongated clamping member or bar 16 which overlies the part 15*b* of the margin of the sheet 15 and is biased against the part 15*b* by a U-shaped elastic yoke 17 which may consist of spring steel and one leg of which is anchored in the clamping bar 16. The other leg of the yoke 17 forms an eyelet which surrounds a coupling pin 20 on a lever 19 installed in a cutout 7*a* of the drawer 7. The lever 19 is pivotable relative to the drawer 7 about the axis of a pin 18 which is located above the pin 19 when the clamping bar 16 bears against the part 15*b*. When the lever 19 moves the pin 20 beyond the dead-center position (to thereby stress the yoke 17 and urge the bar 16 against the part 15*b*), its free portion or handle abuts against an internal stop face 7*aa* of the drawer 7 so that the bar 16 cannot become accidentally separated from the part 15*b*. The cutout 7*a* of the drawer 7*a* further accommodates the aforementioned springy conductor 13 which is connected to the electrode 12. The yoke 17 is sufficiently elastic to insure that the lever 19 continues to abut against the stop face 7*aa* except when grasped by hand to enable a nurse to detach the sheet 15 from the drawer 7. It is clear that the clamping device for the rear part 15*b* of the margin of the sheet 15 can comprise two or more elastic yokes 17 whose lower arms are turnable on a shaft replacing the pin 20 and extending between two spaced-apart levers 19. Other forms of clamping devices (preferably of the quick-release type) can be employed with equai advantage.

The rearmost portion 7*b* of the drawer 7 constitutes a handgrip (resembling the handle of a spade) which can be grasped by hand to introduce the electrode 12 into or to withdraw this electrode from the compartment 4B of the fixedly mounted section 4A. The opening 7*bb* of the handgrip 7*b* contains a suitably rounded centrally located projection 7*c* which can be engaged by a locking device when the drawer 7 is fully inserted in the compartment 4B so as to lock the drawer 7 in the section 4A. The drawer 7 is then biased against a sealing element or gasket 120 which is installed in the section 4A and includes four portions 21, 22, 23 and 24. The portion 21 is installed in the section 4A in front of the clamping bar 16, the portion 23 in parallel to the portion 21 and is installed in the section 4A below the edge portion 12*a* of the electrode 12, and the portions 22, 24 (which are parallel to each other) engage the upper side of the drawer 7 and extend in parallelism with the direction indicated by arrow A. The portions 21–24 of the gasket 120 form a rectangular or square frame which surrounds the interelectrode gap 110 from above at three sides (portions 21, 22 and 24) and lies below the front portion of the periphery of the gap (portion 23). The portions 21–24 of the gasket 120 actually bear against the carrier sheet 15, i.e., the portions 22, 24 engage the lateral parts of the margin of the sheet, the portion 21 engages the rear part of the margin in front of the part 15*b* which is clamped by the bar 16, and the portion 23 bears against the exposed underside of the folded-over part 15*a*.

In order to prevent escape of high Z gas at the four corners of the gap 110 when the apparatus is in actual use, the portions 21–24 of the gasket 120 are preferably integrally connected to each other in a manner as shown in FIG. 4 for the portions 22 and 23. The portion 23 has an upwardly extending strip 23*a* which is integral with the adjacent front end of the portion 22. A similar strip (not specifically shown) connects the other end of the portion 23 with the portion 24. The rear ends of the portions 22, 24 are integral with the respective ends of the portion 21. The gasket 120 can be assembled of several discrete portions including those numbered 21–24 and the strip 23*a;* such portions are then sealingly secured to each other by an adhesive or in another suitable way. The hatching indicates in FIG. 4 those sides or surfaces of the portion 23 and strip 23*a* which are bonded to the inner side of the front panel 4*c* to prevent leakage of high Z gas from the gap 110. FIG. 4 further shows that the left-hand end of the edge portion 12*a* extends into a pocket of the strip 23*a* so that the respective portion of the front part of the margin of the sheet 15 sealingly engages the gasket. The same holds true for all four corner portions of the margin of the sheet 15. Proper sealing engagement of the gasket 120 with the section 4A and proper sealing engagement of the margin of the sheet 15 with the gasket 120 is desirable and necessary because the pressure of high Z gas in the gap 110 greatly exceeds atmospheric pressure, i.e., the entrapped high Z gas exhibits a strong tendency to escape into the surrounding atmosphere. This is undesirable for several reasons, i.e., escape of an expensive high Z gas (such as Xenon or Krypton) contributes to the cost of the apparatus and the escape of other types of high Z gas (such as Freon) might be detrimental to the health of the physician, his attendant(s) and/or the patients.

The locking device for the drawer 7 includes the aforementioned projection 7*c* in the opening 7*bb* of the handgrip 7*b* and several members which are mounted on the section 4A above and behind the cutout 7*a*. Such members include a disk or wheel 25 having an actuating handle 27 by means of which the wheel 25 can be turned about the axis of a horizontal shaft 26 mounted in the section 4A at a level above and behind the plate 8, and a wedgelike cam or tooth 25*a* which extends radially from the wheel 25 and can be moved into engagement with the projection 7*c* to thus lock the drawer 7 in the compartment 4B. One of the directions in which the wheel 25 can be rotated through the medium of the handle 27 is indicated by arrow B. The inclination of the front surface of the cam 25*a* is preferably such that the wheel 25 remains in the selected angular position while cam engages the projection 7c and the handle 27 is released, i.e., the drawer 7 remains locked in the compartment 4B until and unless the person in charge decides to turn the wheel 25 in a direction to disengage the cam 25a from the projection 7c. Other types of rapidly engageable and disengageable locking devices for the drawer 7 can be used with equal or similar advantage. The locking device must furnish a reliable retaining action against expulsion of the drawer 7 because the latter tends to move counter to the direction indicated by arrow A when the interelectrode gap 110 is filled with highly compressed high Z gas.

If the gasket 120 is not inflatable (i.e., if its portions 21–24 establish an adequate seal between the margin of the sheet 15 and the section 4A merely in response to full insertion of the drawer 7 into and its locking in the section 4A, the admission of compressed high Z gas can begin as soon as the cam 25a of the locking device assumes the position shown in FIG. 3. The source of compressed high Z gas may include a pump (not shown) which draws high Z gas from a bellows or the like and forces compressed high Z gas to enter the gap 110 via one or more pairs of communicating gas-admitting ports 29, 30 in the section 4A. These ports are machined into or otherwise formed in the lightweight insert 9 below the plate 8. The outer end of the port 29 communicates with the bore of a suitable nipple (not shown) which is connected to the pump outlet by a flexible hose or another conduit. The gas which flows into the gap 110 via port or ports 30 deforms the central part of the sheet 15 and urges such central part into contact with the concave upper side of the electrode 12. If the apparatus is a mammagraph, the sheet 15 is preferably exposed to relatively soft X-rays. To this end, the high Z gas is preferably an inert gas (such as Xenon, Krypton or Freon) which is maintained at a pressure of 6–20 atmospheres.

Air and/or other gases which fill the space between the underside of the sheet 15 and the electrode 12 prior to admission of compressed high Z gas into the space between the upper side of sheet 15 and the electrode 10 is allowed to escape by way of one or more gas-evacuating ports 7e in the drawer 7. Such port or ports communicate with one or more ports 4b in the bottom wall 4E of the section 4A when the drawer 7 is fully inserted into and locked in the compartment 4B. Escape of gases via ports 7e, 4b is desirable in order to insure that the sheet 15 fully overlies each and every portion of the electrode 12 between the gasket portion 21 and the crease at the edge face of the electrode portion 12a as well as between the portions 22, 24 of the gasket 120. This insures the formation of a latent image which is practically free of distortion. The latent image develops when the source 2 emits X-rays which are modulated by the object on the section 4A and penetrate through the film 50, plate 8, insert 9 and electrode 10. The electrons which are released by X-rays in the body of compressed high Z gas (resp. the ions which develop during exposure to X-rays) can form a sharp latent image due to spherical shape of the sheet 15, i.e., due to the fact that the sheet lies snugly against the concave side of the electrode 12. When the exposure is completed, the handle 27 of the locking device is actuated to unlock the drawer 7, and the drawer is withdrawn from the compartment 4B to be inserted into the unit 6 via inlet 6a whereupon the unit 6 converts the latent image into a visible image of the X-rayed object. The formation of an undistorted latent image is attributed to the fact that the spherical electrodes 10, 12 are centered at the source 2 of X-rays.

The thickness of the front panel 4c of the section 4A can be less than one centimeter. Thus, when a patient occupies the seat 1c and places her breast onto the section 4A, the rib cage is located in immediate proximity to the foremost portion of the gap 110, i.e., the apparatus can make an image of the entire breast including the portion immediately adjacent the ribs. The making of latent images of the entire breast is made possible by the fact that the front portion of the gap 110 is extended into very close proximity of the outer side face 4D and that the upper side of the sheet 15 is unobstructed in the region at the inner side of the panel 4c, i.e., that the sheet 15 also extends all the way to the inner side of this panel. Such extension of the sheet all the way to the panel 4c is possible because the portion 23 of the gasket 120 does not overlie the drawer 7 from above, i.e., because the portion 23 is located below the edge portion 12a in spite of the fact that it sealingly engages the respective part (15a) of the margin of the sheet 15. It has been found that the combined thickness of the panel 4c and the corresponding portion of the protective film 50 need not exceed a few millimeters.

When the exposure is completed, the high Z gas is permitted to escape from the gap 110 back into the bellows so that the pressure in the gap 110 drops to atmospheric. The innate elasticity of the sheet 15 suffices to cause the central part of the sheet to reassume the shape shown in FIG. 3, i.e., the central part of the sheet is substantially or nearly flat and its center is located close to but preferably does not touch the center of the upper electrode 10. The distortion of latent image at the upper side of the sheet 15 (in the position shown in FIG. 3) is not pronounced; in fact, the distortion is surprisingly low and is observable primarily at the four corners of the sheet, i.e., in regions which are not likely to contain critical or very important portions of the latent image. Absence of pronounced distortion of the latent image upon evacuation of compressed high Z gas from the gap 110 is attributable to the fact that all or nearly all zones of the central part of the sheet 15 in the gap undergo the same or substantially identical stretching action when the compressed high Z gas enters the gap 110 via ports 29 and 30. Therefore, when the high Z gas is permitted to escape from the imaging chamber, the contraction of all or nearly all zones of the central part of the sheet 15 is also uniform or practically uniform which, in turn, insures that distortion of the latent image is much less pronounced than in heretofore known imaging chambers employing spherical electrodes.

In the pressure vessel of the imaging chamber 4 of FIGS. 1 to 4, the compressed high Z gas in the gap 110 urges the sheet 15 against that electrode (12) which is more distant from the source 2 of X-rays. The front portion of the electrode 12 (i.e., that portion which is nearer to the front panel 4c) is almost parallel to the direction (arrow A) in which the drawer 7 is inserted into the compartment 4B. The rear portion of the electrode 12 slopes gradually upwardly (as viewed in FIG. 3) toward the clamping bar 16.

Figure 5:
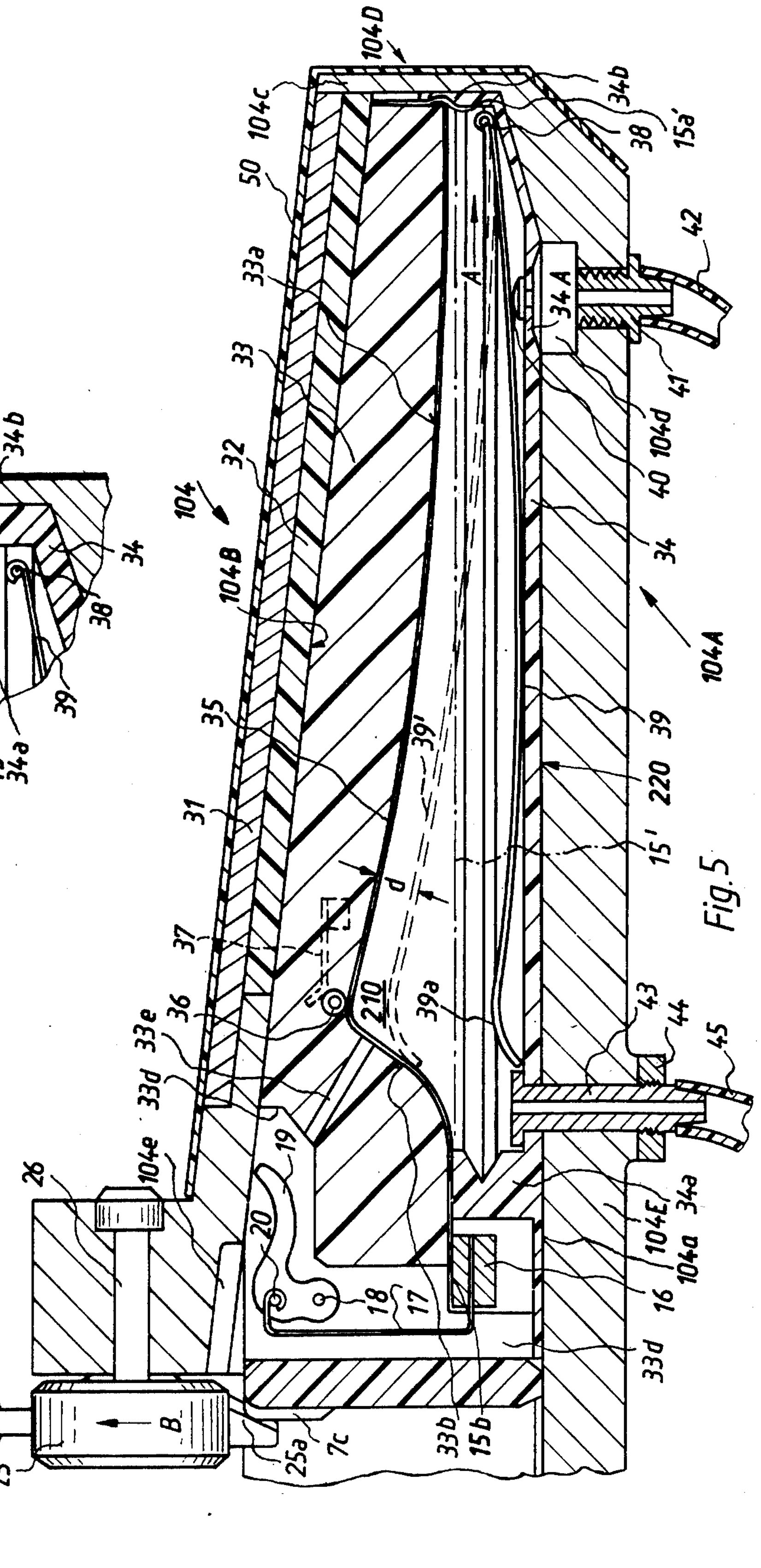
FIG. 5 is a longitudinal vertical sectional view of a modified ionography imaging chamber.

FIG. 5 illustrates a modified imaging chamber 104 whose pressure vessel includes a stationary section 104A and a withdrawable section or drawer 33. The section 104A includes a beryllium plate 31 located above an insert 32 made of a pressure-resistant material (e.g., polyurethane or acrylic foam) which offers little resistance to the passage of X-rays. The source of X-rays is assumed to be located above the protective film 50 which coats the upper side of the plate 31. The insert 32 defines a guideway or track for the upper side of the reciprocable drawer 33; the underside of the properly inserted drawer 33 rests on a sealing element or gasket 220 which is secured to an internal surface 104*a* bounding a portion of the compartment 104B in the section 104A. Three portions 34*a* of the frame-like gasket 220 engage the underside of the spherical electrode 35 on the drawer 33, and a fourth portion 34*b* of the gasket 220 engages an upwardly bent part 15*a'* of the dielectric carrier sheet 15 immediately behind the front panel 104*c* of the chamber 104.

The electrode 35 overlies and conforms to the outline of the spherical underside 33*a* of the drawer 33. This electrode is connected with a pin-shaped conductor 36 which extends laterally from the drawer 33 and engages a springy conductor 37 in or on the section 104A when the drawer is properly inserted into the compartment 104B. The conductor 37 is connected to one pole of a suitable source of electrical energy, not shown, and is preferably installed in the compartment 104B.

The forward part of the lower portion of the section 104A contains a transversely extending conductor 38 which is connected to the other pole of the energy source (preferably to the ground) and constitutes a shaft or pivot means for a second spherical electrode 39. The latter normally assumes the position which is shown in FIG. 5 by solid lines. A pusher 40 is connected with a diaphragm-like portion 34A of the gasket portion 34 in the compartment 104B. When the diaphragm 34A is deformed in response to admission of a suitable fluid into a recess 104*d* in the bottom wall 104E of the section 104A, the pusher 40 pivots the lower spherical electrode 39 from the solid-line position to the broken-line position 39' in which the rear portion 39*a* of the electrode 39 abuts against a suitably inclined internal surface 33*b* of the drawer 33. The electrode 39 is arrested by the surface 33*b* in a position (39') in which the width d of the interelectrode gap 210 assumes a predetermined optimum value. The electrodes 35, 39 are then centered at the source of X-rays. The gap 210 can receive compressed high Z gas through one or more clearances between the periphery of the electrode 39 (in the position 39') and the properly inserted drawer 33. The recess 104*d* in the bottom wall 104E can receive compressed fluid from a suitable source by way of a conduit or hose 42 connected to a nipple 41 which is threadedly connected with the wall 104E and whose axial passage communicates with the recess 104*d*. The compressed gas which is admitted via hose 42 may be a buffer gas (such as $CO_2$ gas) which can be readily separated from high Z gas. The pusher 40 is mounted in close proximity of (behind) the shaft 38 for the electrode 39. The means for compressing the gas which is admitted via hose 42 may constitute a suitable pump or a commercially available bottle containing compressed $CO_2$ gas. As a rule, the presure of gas in the recess 104*d* will slightly exceed the pressure of compressed high Z gas in the gap 210 to insure that the electrode 39 is maintained in the position 39' during exposure of an object on the section 104A to X-rays.

Figure 6:
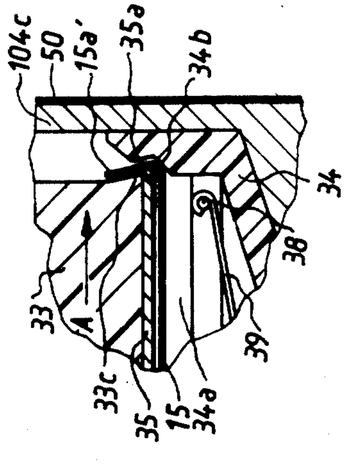
FIG. 6 is an enlarged view of a detail in the right-hand portion of FIG. 5.

FIG. 6 shows that the front part 15*a'* of the margin of the sheet 15 is bent over the front edge portion 35*a* of the electrode 35 and the front edge portion 33*c* of the drawer 33 so that the extent of flexure of part 15*a'* is substantially less than 180 degrees but not substantially less than 90 degrees (in FIG. 6, the extent of flexure of the part 15*a'* with respect to the part of the sheet 15 immediately behind the part 15*a'* is approximately 100 degrees). The locking device (which is identical with or analogous to the locking device of FIG. 3 and whose parts are denoted by similar reference characters) urges the properly inserted drawer 33 in the direction indicated by arrow A so that the crease below the part 15*a'* of the sheet 15 extends into a shallow seat of the relatively thin gasket portion 34*b*. In this way, the image-receiving part of the sheet 15 is closely adjacent to the front side face 104D of the imaging chamber 104, i.e., the chamber 104 exhibits the same advantages as the chamber 4. The rear part 15*b* of the margin of the sheet 15 is clamped to the drawer 33 in a manner similar to that shown in FIG. 3; therefore, the parts of the clamping means are designated by reference characters corresponding to those shown in FIG. 3. The clamping means is installed in a cutout 33*d* of the drawer 33.

When the sheet 15 is properly clamped to the drawer 33, it assumes the position 15' which is designated by a phantom line. The diaphragm 34A thereupon causes the electrode 39 to move to the position 39'. In the next step, the gap 210 receives compressed high Z gas via conduit or hose 45 and a nipple 43 which is installed in the wall 104E and is held in requisite position by a nut 44. The high Z gas biases the sheet 15 from the position 15' to a position in which the sheet overlies each and every portion of the underside of the electrode 35. The compressed high Z gas cannot escape from the gap 210 because it is confined within the gasket 220. Three portions of the gasket 220 bear against the underside of the sheet 15 and the fourth portion of the gasket bears against the upturned part 15*a'* of the sheet margin. The rear portion of the sheet overlies the internal surface 33*b* above the rear portion 39*a* of the electrode 39 (which is then held in the position 39'). Air which has filled the space between the sheet 15 and electrode 35 prior to admission of compressed high Z gas can escape by way of one or more evacuating ports 33*e* machined into or otherwise formed in the drawer 33. The port 33*e* which is shown in FIG. 5 admits expelled gas into the cutout 33*d* of the drawer 33. The cutout 33*d* communicates with the atmosphere by way of a channel 104*e* in the section 104A.

The sheet 15 automatically reassumes the position 15' when the exposure is completed and the high Z gas is evacuated from the gap 210. Withdrawal of the drawer 33 from the compartment 104B must be preceded by evacuation of compressed fluid from the recess 104*d*, i.e., the electrode 39 should be allowed to reassume the solid-line position of FIG. 5.

The combined thickness of the gasket portion 34*b*, film 50 and panel 104*c* need not exceed a few millimeters, i.e., the rib cage of a patient can be placed into immediate proximity of the foremost portion of that part of a sheet 15 in the gap 210 which receives a latent image.

The rear part of the internal surface 33*b* of the drawer 33 is flat or substantially flat, i.e., the clamping bar 16 biases the rear part 15*b* of the margin of the sheet 15 against a flat surface.

Gaskets which are utilized in the ionography imaging chambers 4 and 104 of the present invention are preferably of the type disclosed in the commonly owned copending application Ser. No. 768,539 filed Feb. 14, 1977 by Kurt Thate et al. for "Sealing Device". The disclosure of the copending application is incorporated herein by reference. A feature of the sealing device which is disclosed in the application Ser. No. 768,539 is that its portions can be deformed into adequate sealing engagement with a section of the pressure vessel even if the pressure of deforming gas is less than the pressure of high Z gas in the interelectrode gap. This is due to the fact that the high Z gas assists the portions of the sealing element in furnishing a satisfactory sealing action. Thus, the sealing action can be furnished by the locking means for the drawer 7 or 33 (the cam 25*a* biases the gasket 120 or 220 into sealing engagement with the margin of the sheet 15), by the gas which is used to inflate the gasket (if an inflation is needed at all), and by the compressed high Z gas in the interelectrode gap. The resulting sealing action is amply sufficient to prevent the escape of high Z gas even if the high Z gas is maintained at an elevated pressure (up to 20 atmospheres superatmospheric pressure).

Experiments which were carried out with the improved imaging chamber prove that it fully meets all of the aforementioned objects, i.e., that the foremost part of the latent image on a sheet 15 in the interelectrode gap is much closer to the outer side face of the pressure vessel including the sections 4A and 7 or 104A and 33 than in heretofore known ionography imaging chambers. As mentioned above, this is of particular importance in the making of X-rays of breasts of female patients. The main reason for such closeness of the foremost part of the latent image to the outer side face of the pressure vessel is that the portion 23 of the gasket 120 does not overlie that side of the spherically deformed sheet 15 which faces the source of X-rays and that such portion of the gasket is not disposed between the image-receiving side of the sheet and the front panel of the imaging chamber (in FIG. 5, only a very thin portion 34*b* of the gasket 220 is disposed between the image-receiving side of the sheet 15 and the front panel 104*c*). In heretofore known imaging chambers, the entire margin of the receptor sheet is surrounded by relatively wide gaskets, threadedly secured connectors or the like, i.e., the width of the space between the foremost part of the latent image and the front side face of the imaging chamber is several times the width of such space in the improved imaging chamber.

Figure 7:
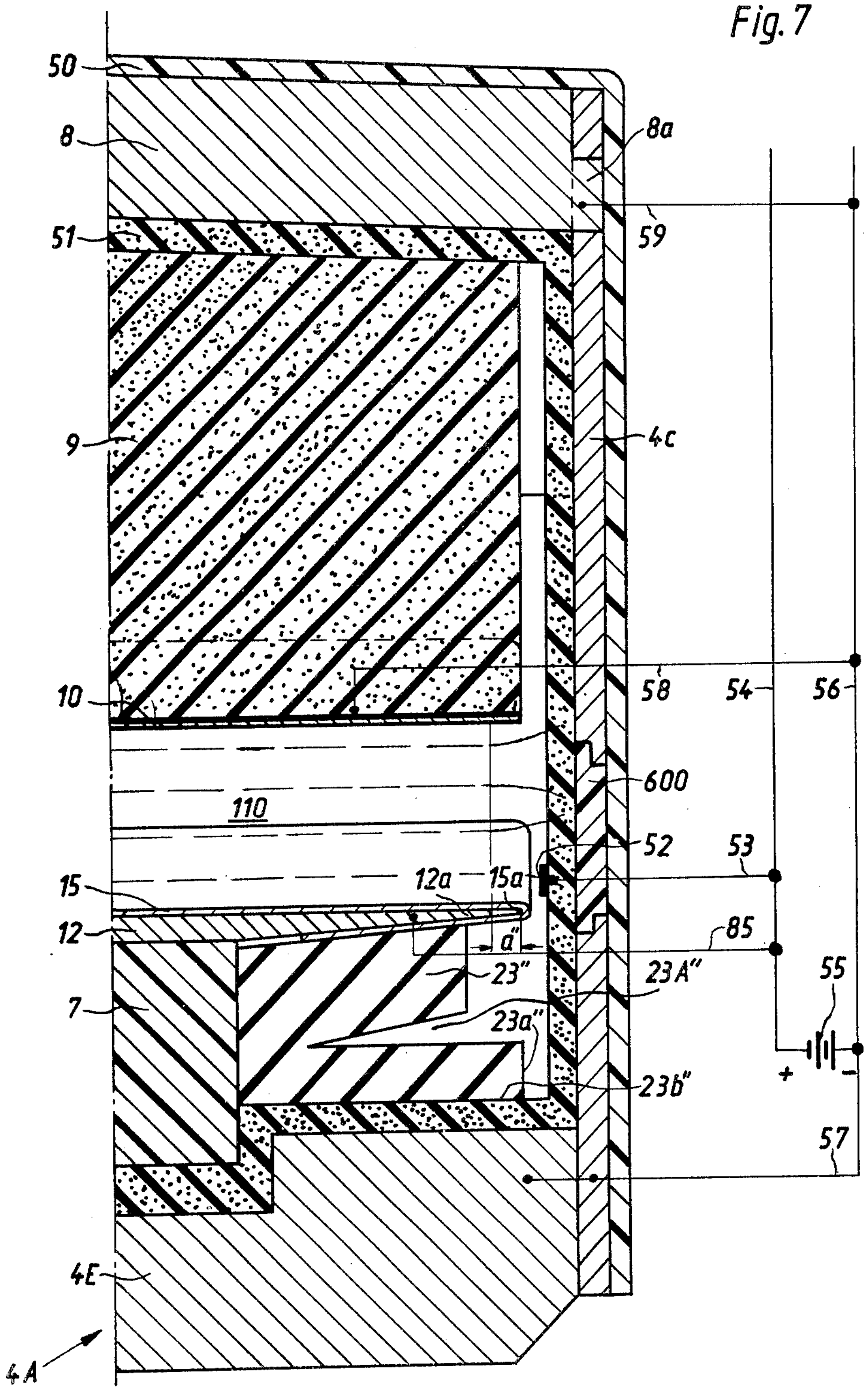
FIG. 7 is an enlarged fragmentary longitudinal vertical sectional view of an imaging chamber which resembles the imaging chamber of FIG. 3 but is further provided with a narrow strip-shaped auxiliary electrode.

However, the aforementioned experiments further indicate that it is not always possible to take full advantage of the closeness of foremost part of the latent image to the outer side face of the imaging chamber. This is attributed to the fact that, from time to time, a distortion of the field takes place at the leader or front edge portion of the electrode which is overlapped by the sheet 15 when the source 2 emits X-rays. Such distortion has been observed at the front part of the edge portion of the electrode 12 shown in FIG. 3 so that the resolution of a 5 to 10 mm wide strip of the latent image in immediate proximity to the inner side of the front panel 4*c* is not entirely satisfactory. The image portion within such strip is blurred and distorted. The just mentioned blurring and distortion of the latent image at a level above the foremost part of the edge portion 12*a* of the electrode 12 can be eliminated, either entirely or practically entirely, by a construction which is shown in FIG. 7. All such parts of the imaging chamber portion which are shown in FIG. 7 and are identical with or clearly analogous to corresponding parts of the imaging chamber of FIG. 3 are denoted by similar reference characters. The bottom wall 4E and the front panel 4*c* of the section 4A consist of steel. The front panel 4*a* is preferably detachable from the bottom wall 4E and from other components of the section 4A. The beryllium plate 8 has one or more forwardly extending projections 8*a* which are snugly received in complementary openings of the front panel 4*c*. The protective film 50 of lacquer or the like coats all such exposed sides of the metallic parts 4*c* and 8 which are likely to be contacted by a patient.

The manner in which the front part 15*a* of the margin of the dielectric receptor sheet 15 is folded over the edge portion 12*a* of the lower electrode 12 of FIG. 7 is the same as described in connection with FIGS. 2 and 3. The material of the sheet 15 is elastic and the rear part of the margin of this sheet is assumed to be clamped to the section 7 in the same way as shown in FIG. 3. The difference between the front portion 23" of the gasket shown in FIG. 7 and the front portion 23 of the gasket 120 of FIG. 3 is that the front face 23*a*" of the portion 23" does not abut against the inner side of the front panel 4*c*; instead, the underside 23*b*" of the portion 23" is sealingly secured (e.g., bonded) to the material immediately therebelow. It has been found that such configuration and mounting of the portion 23" enhance its stability and strength when the gasket is deformed and the portion 23" sealingly engages the folded-over part 15*a* of the margin of the sheet 15. The portion 23" sealingly engages the underside of the part 15*a* with a force which increases proportionally with increasing pressure of high Z gas in the gap 110. The gas flows into the space 23A" between the upper and lower halves of the gasket portion 23" through the narrow clearance between the crease of the sheet 15 and the inner side of the front panel 4*c*.

Another difference between the imaging chambers of FIGS. 3 and 7 is that the section 4A of FIG. 7 comprises an internal liner 51 which consists of an elastomeric synthetic plastic material, such as polyurethane. This liner overlies the upper side of the bottom wall 4E, the inner side of the front panel 4*c* and the underside of the plate 8 (i.e., it extends between the plate 8 and the lightweight insert 9 of the sections 4A). The elastic liner 51 furnishes an additional sealing action to prevent the escape of expensive or aggressive high Z gas from the gap 110. Furthermore, the liner 51 prevents generation of sparks between one of the electrodes and the metallic parts of the section 4A when the spherical electrodes 10 and 12 are connected to the opposite poles of a high-voltage D-C energy source 55. Still further, the liner portion which coats the inner side of the front panel 4*c* facilitates the application of one or more auxiliary electrodes which serve to prevent blurring and/or distortion of the latent image in the region immediately adjacent to the clearance between the crease of the sheet 15 and the front panel 4*c*. FIG. 7 shows a single relatively narrow strip-shaped metallic auxiliary electrode 52 bonded to the inner side of that portion of the liner 51 which coats the inner side of the front panel 4*c*. The bonding medium is preferably a suitable adhesive. The auxiliary electrode 52 is closely adjacent to the foremost part of the edge portion 12*a* of the lower electrode 12 of FIG. 7 and is parallel to such edge portion, i.e., it extends substantially at right angles to the plane of FIG. 7 and curves the same way as the edge portion 12*a*. Conductors 53 and 54 connect the auxiliary electrode 52 with the positive pole of the energy source 55. The positive pole of the source 55 is further connected with the electrode 12 by conductor means 85. The negative pole of the source 55 is connected with the front panel 4c and bottom wall 4E, electrode 10 and beryllium plate 8 by additional conductor means 56, 57, 58 and 59.

The provision of auxiliary electrode 52 and the just described electrical connections between the poles of the energy source 55 and the electrodes insure that the lines of equal potential (indicated in FIG. 7 by broken lines) extend practically to the front end face of the edge portion 12a of the lower electrode 12 save for the minute distance a″ which has been greatly exaggerated in FIG. 7 for the sake of clarity. The lines of equal potential are parallel to the exposed surfaces of the spherical electrodes 10 and 12. The corresponding field lines (which, as known, are always normal to the lines of equal potential) are normal to the exposed surfaces of the electrodes 10 and 12, i.e., they intersect each other at the source of X-rays. The field lines also extend close to the crease between the part 15a of the margin and the image-bearing portion of the sheet 15, i.e., they are absent only within the relatively narrow strip of the upper side of the sheet 15 whose width equals a″. Consequently, the latent image remains undistorted along the entire upper side of the sheet 15 within the confines of the lateral and rear portions of the gasket and practically all the way to the crease at the tip of the edge portion 12a save for the narrow strip whose width equals a″. In actual practice, the width a″ is a small fraction of one millimeter, normally less than 0.5 mm. In other words, distortion of the latent image at the upper side of the sheet 15 shown in FIG. 15 might take place in immediate proximity of the inner side of the front panel 4c but the eventually distorted portion of the latent image is so narrow that it cannot be discerned with the naked eye.

The distortion- and blur-eliminating effect of the electrode 52 can be enhanced by placing it adjacent to an insulator, for example, a strip-shaped insert 600 consisting of suitable synthetic plastic or ceramic material and installed in the front panel 4c between the protective film 50 and the liner 51. The insert 600 prevents undesirable superimposition of the effect of electrode 52 upon the front panel 4c which is connected to the negative pole of the energy source 55, the same as the electrode 10 (the panel 4c can be said to act as an electrode). The insert 600 actually constitutes the pane of a window whose frame is defined by a metallic part (4c) of the pressure vessel between the foremost part of the interelectrode gap and the front or outer side face of the vessel.

As shown in FIG. 7, the auxiliary electrode 52 is located close to the electrode 12, i.e., nearer to that electrode which is contacted by the sheet 15 during the making of a latent image. This is desirable because it contributes to establishment of clearly defined and stable electric fields. Such stable fields will be established if the metallic parts of the pressure vessel (these include the plate 8, the front panel 4c and the bottom wall 4E) are connected to one of the two poles of energy source 55, i.e., to the same pole as one (10) of the electrodes 10 and 12. Thus, the potential of one of the electrodes is identical with or closely approximates that of the parts 8, 4c and 4E. The potential of the other electrode (12) differs from the pressure vessel potential practically by the entire potential difference between the two electrodes. The distortion of the field is much more pronounced at the front edge portion of the electrode 12 so that the placing of auxiliary electrode in close or immediate proximity of the edge portion 12a greatly reduces the extent of such distortion. The undesirable effect of voltage which is applied to metallic parts of the pressure vessel is eliminated by insertion of the insulator 600 into the front panel 4c in front of the auxiliary electrode 52. If desired, the insulator 600 can constitute a much larger part of the front panel 4c.

The distortion eliminating or reducing effect of the auxiliary electrode (especially if the imaging chamber comprises a single auxiliary electrode) can be reduced in a different way, namely, by applying to the auxiliary electrode a potential which is much higher than that applied to the electrode 12.

Figure 8:
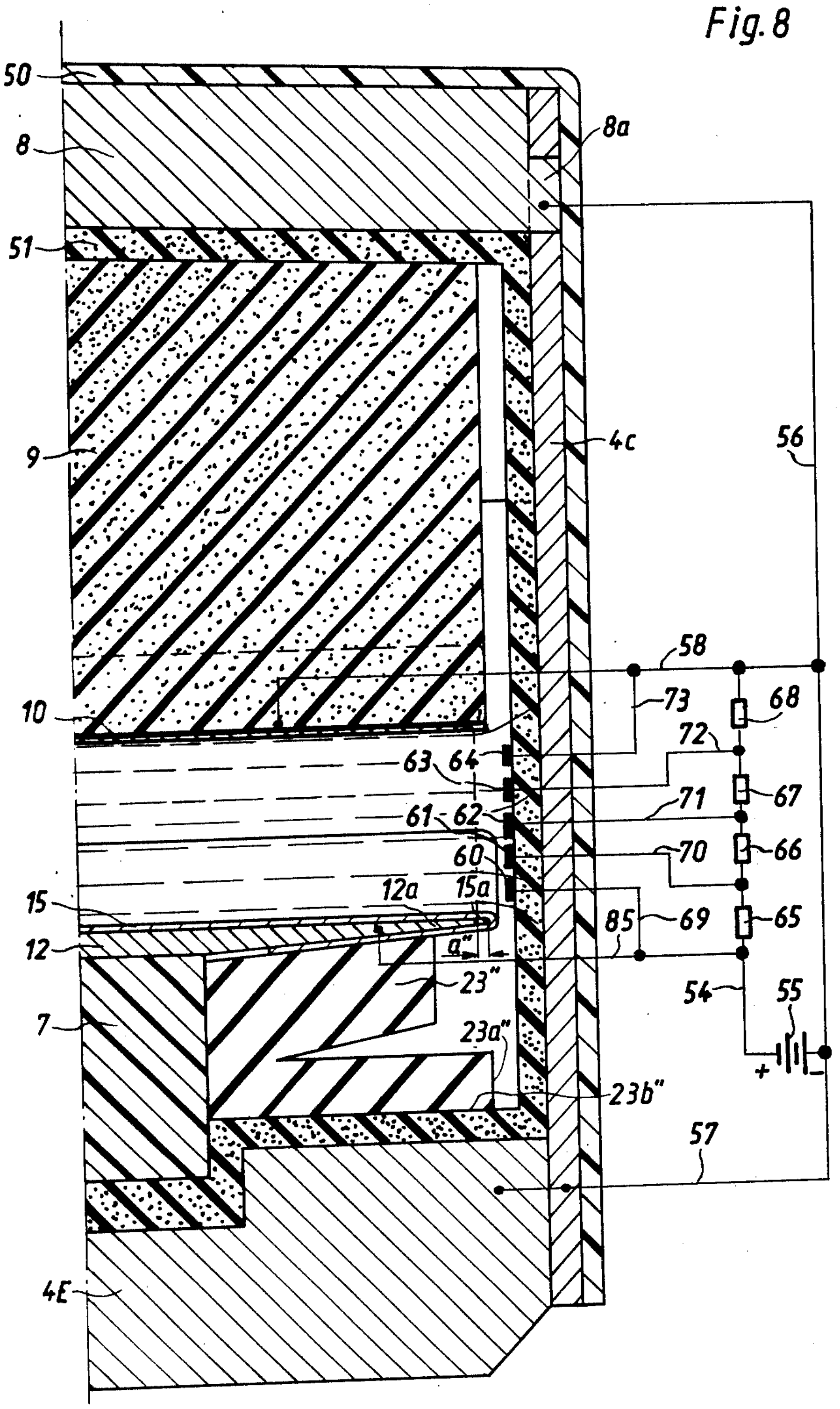
FIG. 8 illustrates a first modification of the imaging chamber of FIG. 7 wherein the foremost portion of the interelectrode gap contains several elongated strip-shaped electrodes.

FIG. 8 shows a first modification of the imaging chamber of FIG. 7. The single auxiliary electrode 52 is replaced with a row of five narrow strip-shaped auxiliary electrodes 60, 61, 62, 63 and 64 which are bonded to the inner side of the liner portion coating the inner side of the front panel 4c between the front edge portion 12a of the lower electrode 12 and the front edge portion of the electrode 10. The auxiliary electrodes 60–64 are connected with the poles of the energy source 55 by the aforementioned conductors 54, 56 and discrete conductors 69, 70, 71, 72 and 73. The uppermost auxiliary electrode 64 is connected to the negative pole of the source 55 by the aforementioned conductor 58 which connects the negative pole of the source 55 to the electrode 10. The conductor 54 is connected with the conductor 58 by a resistor chain 65, 66, 67, 68 and the conductors 70, 71, 72 are connected to the conductor 54 between pairs of neighboring resistors. It will be seen that the auxiliary electrode 60 (which is nearest to the electrode 12) is directly connected with the positive pole of the source 55 (the same as the electrode 12), and that the uppermost auxiliary electrode 64 is directly connected to the negative pole of the source 55, the same as the electrode 10 which is nearest to the electrode 64. The potentials which are applied to the intermeidate auxiliary electrodes 61, 62 and 63 lie between such extreme values.

The construction of FIG. 8 insures that the width a″ of the distorted portion of latent image on the sheet 15 can be reduced to a small fraction of one millimeter, even if the panel 4c does not contain an insulating insert, such as the insert 600 of FIG. 7, and the panel 4c is connected to one pole of the energy source 55.

Figure 9:
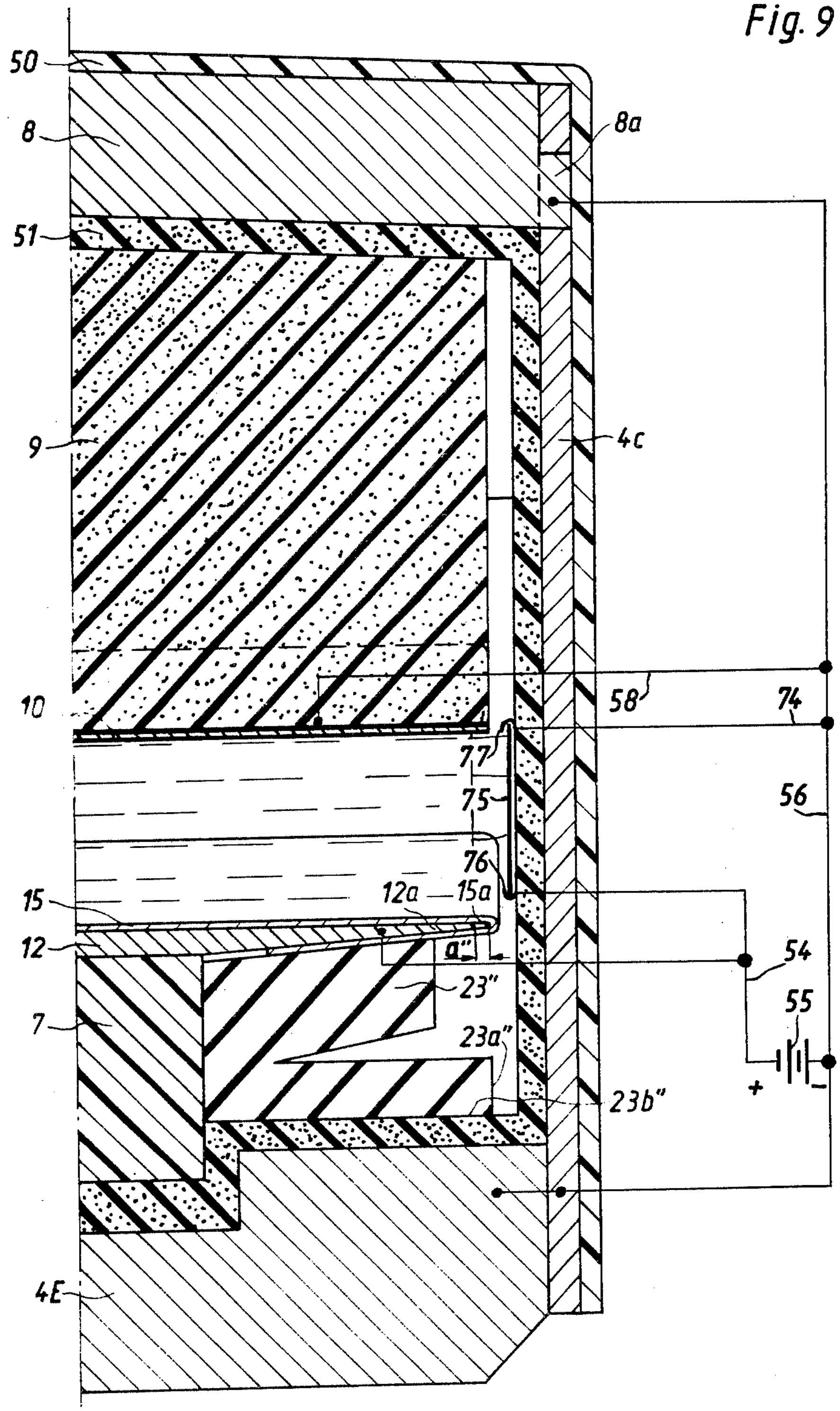
FIG. 9 illustrates a second modification of the imaging chamber of FIG. 7 wherein the narrow strip-shaped electrode is replaced with a wider electrode consisting of semiconductive material.

FIG. 9 shows a second modification of the imaging chamber of FIG. 7. A relatively wide band-like auxiliary electrode 75 consisting of semiconductive material has two elongated marginal portions inserted into two parallel trough-shaped terminals 76, 77 which are respectively connected to the positive and negative poles of the energy source 55 by conductor means 54, 74. The potential which is applied to the upper portion of the electrode 75 equals or approximates the potential which is applied to the electrode 10, and the potential applied to the lower portion of the electrode 75 matches or approximates that applied to the electrode 12. The potentials which are applied to intermediate portions of the auxiliary electrode 75 vary between the potentials of the terminals 76 and 77, substantially the same as in the case of intermediate auxiliary electrodes 61, 62 and 63 shown in FIG. 8. The result is that the width a″ of the distorted zone of latent image on the sheet 15 is a minute or small fraction of one millimeter.

An advantage common to the embodiments of FIGS. 7 to 9 is that the imaging chamber can produce latent images which extend nearly all the way to the outer side face of its pressure vessel, and that the entire latent image is free or practically free of distortion or blurred areas, i.e., a satisfactory latent image extends practically all the way to the fold or crease between the front part 15*a* of the margin and the adjacent portion of a sheet 15 in the interelectrode gap.

It is clear that the imaging chamber of FIG. 5 can also include one or more auxiliary electrodes and/or that it can be provided with a liner corresponding to the liner 51 of FIGS. 7 to 9. The liner not only facilitates the installation of one or more auxiliary electrodes but also serves as a means for protecting the patients by establishing an insulation between the electrodes and the metallic parts of the section 4A.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A method of forming latent images of object-modulated X-rays on a dielectric carrier sheet in an ionography imaging chamber whose interelectrode gap is filled with compressed high Z gas and at least one outer side face of which is accessible to permit the placing of an object onto the chamber, particularly to permit the placing of a breast of a female patient onto the chamber while the rib cage of the patient abuts or is closely adjacent said side face, comprising the steps of extending a portion of the periphery of the interelectrode gap adjacent the one side face of the imaging chamber; inserting a dielectric carrier sheet into the gap and flexing that part of the margin of the inserted sheet which is adjacent said side face of the chamber about one of the electrodes in the chamber through at least 90 degrees; and establishing a fluidproof seal between the entire margin of the inserted sheet and the chamber, including placing a gasket into sealing engagement with said margin so that a portion of the gasket sealingly engages the flexed part of the margin.

2. The method of claim 1, wherein said flexing step includes bending said part of the margin through approximately 180 degrees.

3. The method of claim 1, wherein the electrodes bounding the gap in said chamber are spherical electrodes which are centered at the source of X-rays.

4. The method of claim 1, further comprising the step of biasing one side of the carrier sheet in said gap against said one electrode, said step of establishing a fluidproof seal further including biasing the gasket against the other side of the non-flexed part of the margin of the sheet in said gap.

5. In an apparatus for making X-ray images, a combination comprising a source of X-rays; an ionography imaging chamber including a pressure vessel having first and second sections, first and second electrodes respectively secured to said first and second sections and defining an interelectrode gap for reception of dielectric carrier sheets, said vessel further having an outer side face which is accessible for the placing of an object to be X-rayed between said source and said vessel, particularly for placing a breast of a female patient between said source and said first section while the rib cage of the patient abuts or is closely adjacent to said side face, said gap having a portion which is adjacent said side face so that a part of the margin of a carrier sheet in said gap which extends into said portion of said gap is also adjacent said side face; a gasket mounted in one of said sections opposite the other of said sections, said gasket surrounding said gap and being deformable into sealing engagement with the margin of a carrier sheet in said gap to thereby urge the margin into sealing engagement with the electrode on said other section, said electrode on said other section having an edge portion adjacent said side face and said part of the margin of the carrier sheet in said gap extending beyond said edge portion, said gasket having a portion which flexes said part of the margin of the carrier sheet in said gap along said edge portion through at least 90 degrees and biases the thus flexed part of the margin against one of said sections; and means for admitting compressed high Z gas into said gap between said electrodes within the confines of said gasket.

6. The combination of claim 5, wherein said electrodes are spherical electrodes which are centered at said source of X-rays.

7. The combination of claim 5, wherein said first section has a compartment for said second section and said second section is insertable into and withdrawable from said compartment.

8. The combination of claim 7, wherein said first section is stationary, a carrier sheet being adapted to be placed into a position of overlap with and fully separated from the electrode on said second section upon withdrawal of said second section from said compartment.

9. The combination of claim 8, wherein said second electrode is disposed between said source of X-rays and said first electrode, said admitting means being arranged to admit compressed high Z gas between said first electrode and a sheet in said gap so that the admitted gas biases the sheet against said second electrode.

10. The combination of claim 9, further comprising means for clamping a second part of the margin of a sheet in said gap against said second section, said second section having a flat surface remote from said side face and said clamping means being adjacent to said flat surface.

11. The combination of claim 10, further comprising means for pivotally mounting said first electrode in said first section for movement toward and away from said second electrode, said second section being withdrawable from said compartment upon pivoting of said first electrode to a predetermined position.

12. The combination of claim 8, wherein said gap has a polygonal outline and one of said electrodes has an edge portion adjacent said side face of said pressure vessel, a part of the margin of a carrier sheet in said gap extending beyond said edge portion of said one electrode and said gasket including a plurality of portions, each adjacent to a different side of said polygonal gap, one portion of said gasket bearing against said part of the margin of the sheet in said gap and the other portions of said gasket bearing against the remaining parts of the margin of the sheet in said gap.

13. The combination of claim 12, wherein said gap has four sides and three portions of said gasket engage the respective parts of the margin of the sheet in said gap at one side of said one electrode, the fourth portion of said gasket engaging said first mentioned part of the margin of the sheet in said gap at the other side of said one electrode.

14. The combination of claim 13, wherein said gasket is constructed and assembled to be subjected to the pressure of compressed high Z gas in said gap whereby such gas urges said portions of the gasket into sealing engagement with the respective parts of the margin of the sheet in said gap.

15. The combination of claim 12, wherein said gasket further comprises means for sealingly connecting said one portion to the neighboring portions thereof.

16. The combination of claim 8, wherein said second electrode is more distant from said source of X-rays than said first electrode and said admitting means is arranged to admit compressed high Z gas between the sheet in said gap and said first electrode so that the high Z gas urges the sheet against said second electrode.

17. The combination of claim 16, wherein said second section is insertable into and withdrawable from said first section in a predetermined direction by moving along a substantially straight path, said second electrode having a front portion, as considered in the direction of insertion of said second section, which is substantially parallel to said path and a rear portion which curves gradually in the direction of withdrawal of said second section.

18. The combination of claim 8, wherein said second section includes a rear portion, as considered in the direction of insertion of said second section into said compartment, and further comprising means for releasably clamping the rear part of the margin of a carrier sheet to said rear portion of said second section.

19. The combination of claim 18, wherein said clamping means comprises a transversely extending bar and means for biasing said bar against the respective part of the carrier sheet which overlies said second electrode.

20. The combination of claim 8, wherein said second electrode includes an edge portion extending beyond said second section and the sheet which overlies said second electrode has a folded-over marginal part defining a pocket for said edge portion.

21. The combination of claim 8, wherein said second electrode has an edge portion adjacent to said side face and said gasket includes a portion which folds a part of the margin of a sheet over said edge portion upon insertion of said second section into said compartment.

22. The combination of claim 21, wherein said portion of said gasket has a shallow socket for the edge portion of said second electrode.

23. The combination of claim 21, wherein said gasket is constructed and arranged to bear against the margin of a sheet in said gap with a force which increases proportionally with increasing pressure of high Z gas in said gap.

24. The combination of claim 8, further comprising first conductor means provided in said first section and second conductor means connected with said second electrode and engaging said first conductor means in response to insertion of said second section into said compartment.

25. The combination of claim 5, further comprising auxiliary electrode means including at least one auxiliary electrode disposed in said portion of said gap intermediate said first and second electrodes and extending in substantial parallelism with said part of the margin of the varrier sheet in said gap, a source of electrical energy located outside of said vessel, and conductor means connecting said energy source with said auxiliary electrode.

26. The combination of claim 25, wherein said auxiliary electrode means includes a plurality of auxiliary electrodes.

27. The combination of claim 26, further comprising a resistor chain installed in said conductor means to effect the application of different potentials to different ones of said auxiliary electrodes.

28. The combination of claim 27, wherein said energy source has first and second poles respectively connected to said first and second electrodes, said auxiliary electrodes including a first auxiliary electrode closely adjacent to said first electrode, a second auxiliary electrode closely adjacent to said second electrode, and at least one additional auxiliary electrode between said first and second auxiliary electrodes, said conductor means including first and second conductors respectively connecting said first and second auxiliary electrodes directly to said first and second poles.

29. The combination of claim 28, wherein said resistor chain is connected between said first and second conductors and said conductor means further includes a third conductor connecting said additional auxiliary electrode with said chain intermediate two neighboring resistors.

30. The combination of claim 25, wherein one of said sections includes an insert consisting of insulating material and located between said one auxiliary electrode and the outer side face of said vessel.

31. The combination of claim 30, wherein said insert consists of synthetic plastic material.

32. The combination of claim 30, wherein said insert consists of ceramic material.

33. The combination of claim 30, wherein said one section defines a window and said insert is a pane located in said window.

34. The combination of claim 25, wherein said one auxiliary electrode is nearer to one of said first and second electrodes, said energy source having first and second poles and said conductor means connecting said one auxiliary electrode to one of said poles, and further comprising additional conductor means connecting said one pole to that one of said first and second electrodes which is nearer to said one auxiliary electrode.

35. The combination of claim 25, wherein said one auxiliary electrode is a semiconductor.

36. The combination of claim 35, wherein said semiconductor is a flat band having first and second marginal portions respectively adjacent said first and second electrodes, said energy source having first and second poles respectively connected to said first and second electrodes, said conductor means including first and second terminals respectively connecting said first and second poles with the first and second marginal portions of said semiconductor.

37. The combination of claim 25, further comprising a liner consisting of insulating material and surrounding a substantial part of said gap.

38. The combination of claim 37, wherein said insulating material is elastic.

39. The combination of claim 38, wherein said insulating material is polyurethane.

40. The combination of claim 37, further comprising means for bonding said auxiliary electrode means to said liner.

41. The combination of claim 40, wherein said bonding means is an adhesive.

42. The combination of claim 40, wherein said one auxiliary electrode is a thin and narrow strip consisting of metallic material.

* * * * *